United States Patent
Weatherford

(10) Patent No.: US 7,330,149 B2
(45) Date of Patent: Feb. 12, 2008

(54) METHOD FOR LOCATING MULTIPLE ANGLE SOURCES USING A MONOPULSE RADAR

(75) Inventor: Shaun David Weatherford, Camarillo, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 241 days.

(21) Appl. No.: 11/357,455

(22) Filed: Feb. 9, 2006

(65) Prior Publication Data
US 2007/0182622 A1    Aug. 9, 2007

(51) Int. Cl.
*G01S 13/44* (2006.01)

(52) U.S. Cl. .......................... 342/149; 342/80; 342/92; 342/141

(58) Field of Classification Search ............. 342/80, 342/90, 92–96, 99, 141, 147, 149, 368, 383, 342/384
See application file for complete search history.

(56) References Cited

U.S. PATENT DOCUMENTS

| | | | |
|---|---|---|---|
| 6,697,009 B2 * | 2/2004 | Yu | 342/17 |
| 6,856,280 B1 * | 2/2005 | Eder et al. | 342/147 |
| 6,867,726 B1 * | 3/2005 | Yu et al. | 342/17 |
| 7,136,014 B2 * | 11/2006 | McCord et al. | 342/149 |
| 7,221,307 B1 * | 5/2007 | Friesel | 342/13 |
| 2007/0018882 A1 * | 1/2007 | Manoogian et al. | 342/80 |

* cited by examiner

*Primary Examiner*—Isam Alsomiri
(74) *Attorney, Agent, or Firm*—David S. Kalmbaugh

(57) ABSTRACT

A monopulse radar tracking method which analyzes boresight error information provided a monopulse radar to determine a location for two targets. The monopulse radar tracking method analyzes the boresight error information to determine an angle of arrival for a dominant target and a secondary target.

20 Claims, 12 Drawing Sheets

METHOD FOR LOCATING MULTIPLE ANGLE SOURCES USING A MONOPULSE RADAR

BACKGROUND OF THE INVENTION

1. Field of the Invention

The present invention relates generally to radar used for tracking multiple targets. More specifically, the present invention relates to a monopulse radar tracking method which analyzes boresight error information to determine a location for multiple targets.

2. Description of the Prior Art

Monopulse radar is widely used as a military tracking radar because of its high accuracy and relative immunity to electronic countermeasures that degrade other tracking radar and their associated methods of tracking. Monopulse radar uses a single RF (radio frequency) pulse to gather angle information, as opposed to directing multiple narrow-beam pulses in different directions and looking for a maximum return to identify the target.

As shown in FIG. 1 monopulse antenna 20 is divided into four quadrants TR (top right), TL (top left), BL (bottom left) and BR (bottom right). A target 22, which is an RF reflector, directs a reflection of the single RF pulse at the four quadrants of antenna 20 which is represented by the vectors 23, 24, 26 and 28. The radar's signal processing circuitry then calculates the boresight error for the signal by finding its sum signal, its pitch Delta signal, and its yaw Delta signal.

The sum signal is TLv+TRv+BLv+BRv where the terms TLv, TRv, BLv and BRv represent voltage vector summations in each of the four quadrants of the antenna 20. The pitch Delta signal is (TLv+TRv)−(BLv+BRv) and the yaw Delta signal is (TLv+BLv)−(TRv+BRv).

The boresight error in each axis (Pitch and Yaw) is (Del.Cross.Sum/Sum.Dot.Sum) where Del.Cross.Sum is a cross product and Sum.Dot.Sum is a dot product.

The boresight error information then indicates the angle of target 22 within the radar beam. When there are two targets the averaged boresight error information indicates the angle of arrival of the dominate target. There is, however, a need to utilize the boresight error information to locate the second target.

SUMMARY OF THE INVENTION

The present invention overcomes some of the difficulties of the past including those mentioned above in that it provides for a method for calculating two signals' angles from a monopulse antenna composite signal. This allows a user of the method to determine the location of two targets even though the monopulse antenna information as presently used detects only the dominant RF signal reflected from only one of the two targets.

The method comprising the present invention allows a user to calculate two signals' angles from a monopulse antenna composite signal. The method utilizes an RF signal's angle (associated with the reflection from a first or dominant target) coupled with additional averaged signal information to obtain a smaller RF signal's angle associated with a secondary target. The smaller RF signal's angle is obtained by multiplying an AGC (Automatic Gain Control) power level by a composite boresight angle error, pulling out the DC and AC components of the resulting product and then using these values in addition to the first and second signals' individual estimated voltage amplitudes to determine the smaller RF signal's angle. The two signals' voltage amplitudes are determined from an analysis of AGC behavior.

DETAILED DESCRIPTION OF A PREFERRED EMBODIMENT

Figure 2A:
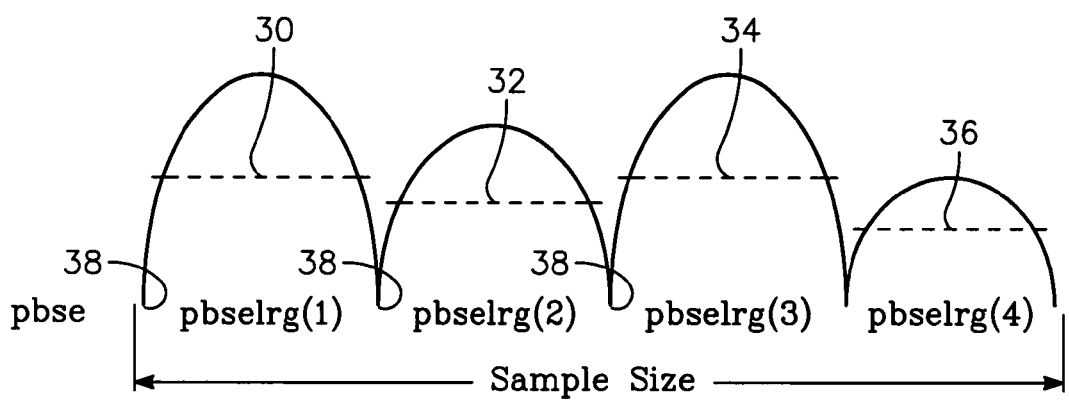
FIGS. 2A-2B, 3A-3B, and 4A-4B illustrate a variety of waveforms used to calculate two signals' angles representing two targets from a monopulse composite signal in accordance with the method of the present invention.
Figure 2B:
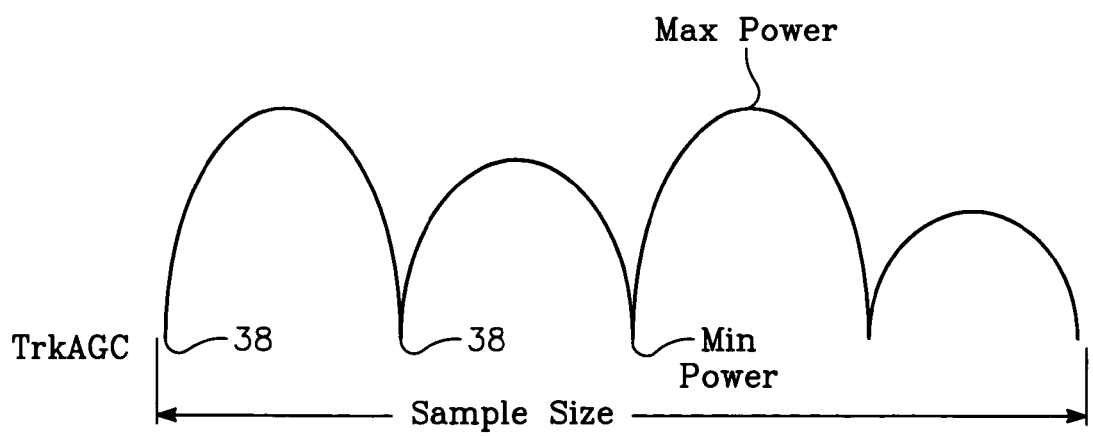

Referring to FIGS. 2A, 2B. 3A, 3B, 4A and 4B, the present invention is a method which allows a user to calculate two signals' angles from a monopulse antenna composite signal. The method utilizes an RF signal's averaged angle (associated with the reflection from a first target) coupled with additional signal information to obtain a smaller RF signal's angle associated with a second target. The smaller RF signal's angle is obtained by multiplying the AGC power level by a composite boresight angle error BSESum2, pulling out the DC and AC components of the resulting product and then using these values in addition to the first and second signals' individual sum channel components S1 and S2 to determine the smaller RF signal's angle. The two signals' estimated voltage amplitudes S1 and S2 are determined from an analysis of AGC behavior.

Referring to FIG. 2A, pitch and yaw boresight errors are averaged across each null-to-null period in a sample size. The following are expressions for large (dominant signal) pitch bore sight error (pbse) and yaw bore sight error (ybse).

$$pbselrg = mean(pbse), \text{ from null to null end} \quad (1)$$

$$ybselrg = mean(ybse) \quad (2)$$

The mean and variance of bore sight error across the sample set is determined by taking the average of all means and the variance of all means as set forth by the following expressions. In FIG. 2A, the dashed line 30 represents the mean for pbselrg(1), dashed line 32 represents the mean for pbselrg(2), dashed line 34 represents the mean for pbselrg(3), and dashed line 37 represents the mean for pbselrg(4). The mean for the sample size is represented by the reference numeral 36.

$$pbselrgmean = average(pbselrg(1), pbselrg(2) \ldots pbselrg(n)) \quad (3)$$

$$Pbselrgvar = variance(pbselrg(1), pbselrg(2) \ldots pbselrg(n)) \quad (4)$$

The variance is equal to the standard deviation squared which is the average of the squares of the deviations of a number of observations from their mean value.

Referring to FIG. 2B, S1 and S2, which represent each RF signal's component in a sum channel, are determined by finding maximum and minimum AGC power levels (power in dBm) across a sample size as shown in FIG. 2B, after converting AGC power to linear power in accordance with the following expressions.

$$\text{Linear Power} = 10^{TrkAGC/10} \tag{5}$$

$$\text{Max AGC Pwr} = \text{Max (Linear Power)} \tag{6}$$

$$\text{Min AGC Pwr} = \text{Min (Linear Power)} \tag{7}$$

$$S1 = \tfrac{1}{2} \ast \text{sqrt(Max AGC Pwr)} + \tfrac{1}{2} \ast \text{sqrt(Min AGC Pwr)} \tag{8}$$

$$S2 = \tfrac{1}{2} \ast \text{sqrt(Max AGC Pwr)} - \tfrac{1}{2} \ast \text{sqrt(Min AGC Pwr)} \tag{9}$$

The linearized power is then multiple by pitch and yaw boresight errors in accordance with the following expressions.

$$pbsesum2 = pbse \ast \text{Linear Power} \tag{10}$$

$$ybsesum2 = ybse \ast \text{Linear Power} \tag{11}$$

Figure 4A:
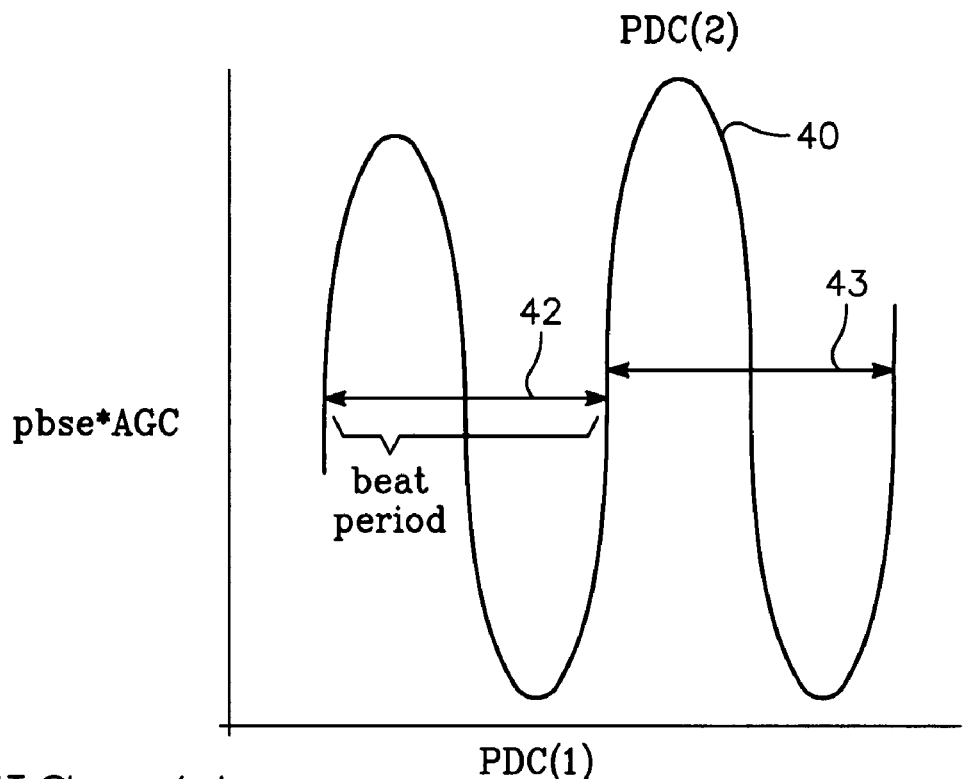

Equations 10 and 11 yield a sine wave with a DC offset in both the pitch and yaw axes. FIG. 4A illustrates the waveform for equation 10 which is the sine wave 40 with DC offsets 42 and 43. To find the DC component, the method of the present invention requires an averaging across each null-to-null period as set forth by the following expressions.

$$PDC = \text{mean}(pbsesum2) \tag{12}$$

$$YDC = \text{mean}(ybsesum2) \tag{13}$$

Figure 4B:
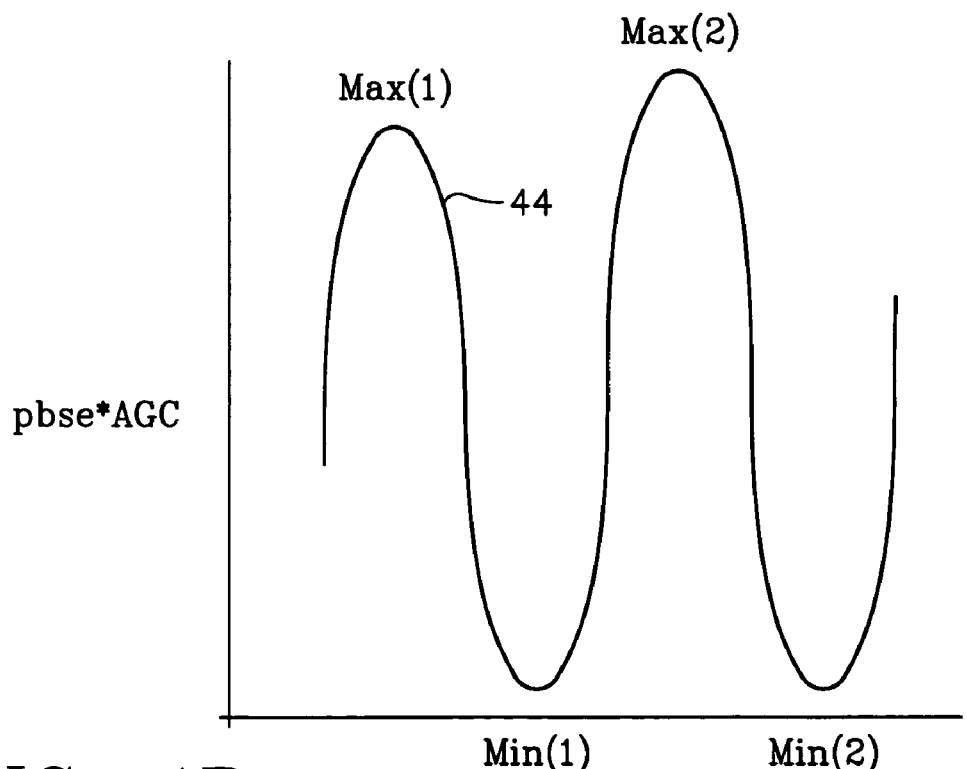

The AC component either by: (1) finding peak-to-peak values for the sine wave 44 of FIG. 4B and then dividing by two; (2) or by subtracting the DC component from each element, taking the RMS value and multiplying by sqrt(2).

The following expressions are utilized to calculate the AC term by finding the peak-to-peak and dividing by two.

$$PAC = (\text{max}(pbsesum2) - \text{min}(pbsesum2))/2 \tag{14}$$

$$YAC = (\text{max}(ybsesum2) - \text{min}(ybsesum2))/2 \tag{15}$$

The following expressions are utilized to calculate the AC term by subtracting the DC component from each element, taking the RMS value and multiplying by sqrt(2).

$$PACtmp = pbsesum2 - PDC \tag{16}$$

$$YACtmp = pbsesum2 - YDC \tag{17}$$

$$PAC = \text{sqrt}[2 \ast \text{mean}(PACtmp \ast PACtmp)] \tag{18}$$

$$YAC = \text{sqrt}[2 \ast \text{mean}(YACtmp \ast YACtmp)] \tag{19}$$

The following expressions yield the smaller RF signal's angle when a DC method is used to determine the angle.

$$pbsemldc = (1/S2)^2 \ast PDC - (S1/S2)^2 \ast pbselrg \tag{20}$$

$$ybsemldc = (1/S2)^2 \ast YDC - (S1/S2)^2 \ast ybselrg \tag{21}$$

The following expressions yield the smaller RF signal's angle when an AC method is used to determine the angle.

$$pbsemlac = (1/(S1 \ast S2)) \ast PAC - pbselrg \tag{22}$$

$$ybsemlac = (1/(S1 \ast S2)) \ast YAC - ybselrg \tag{23}$$

Figures 3A, 3B:
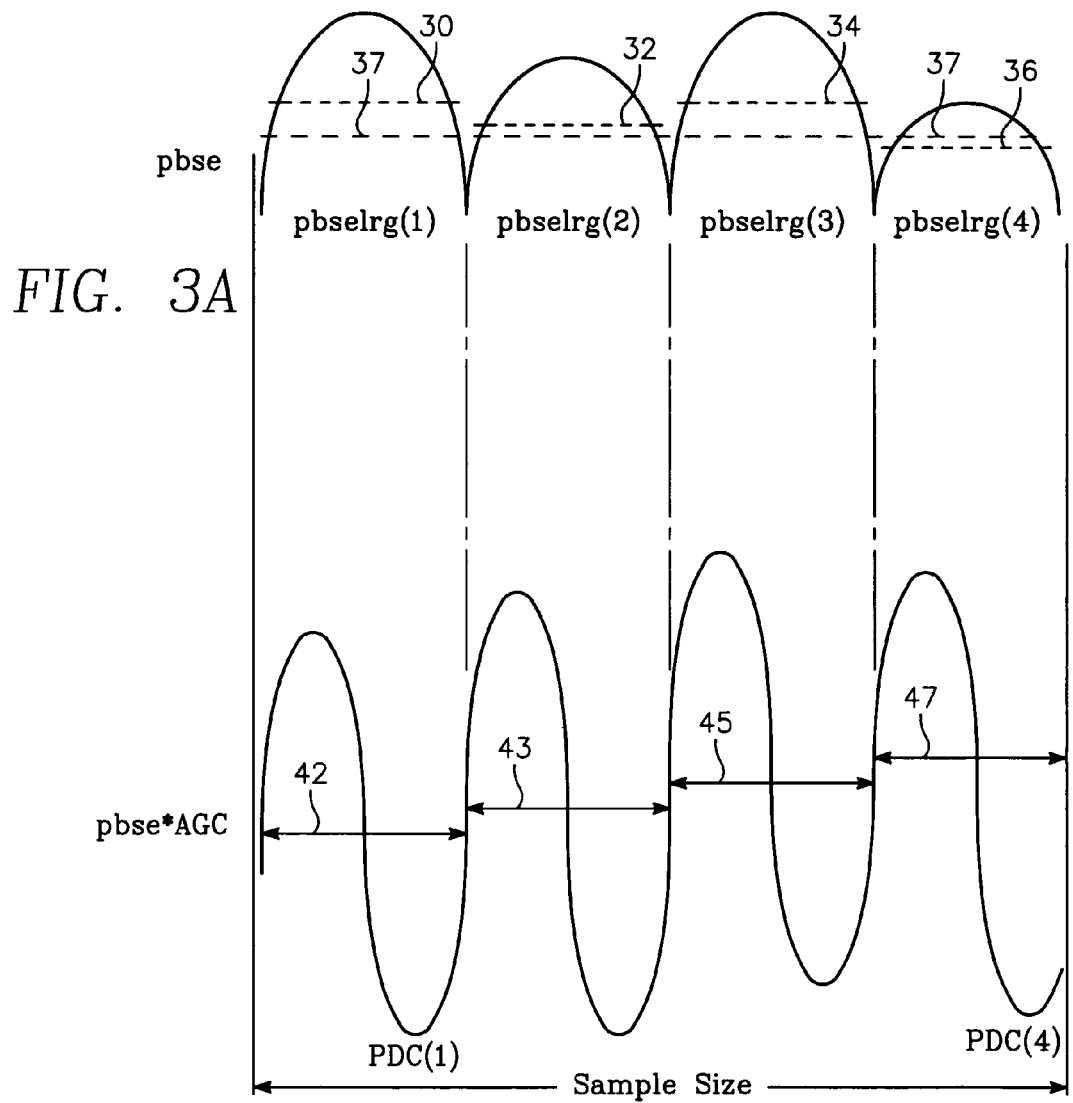

Referring to FIGS. 3A and 3B, the smaller signal's mean and variance is calculated from each bse (bore sight error) calculation.

$$pbsemldc(1) = (1/S2)^2 \ast PDC(1) - (S1/S2)^2 \ast pbselrg(1) \tag{24}$$

$$pbsemldc(2) = (1/S2)^2 \ast PDC(2) - (S1/S2)^2 \ast pbselrg(2) \tag{25}$$

$$pbsesmlmean = \text{average}(pbsemldc(1), pbsemldc(2) \ldots pbsemldc(n)) \tag{26}$$

$$pbsesmlvar = \text{variance}(pbsemldc(1), pbsemldc(2) \ldots pbsemldc(n)) \tag{27}$$

It should be noted that the DC offsets for the waveform illustrated in FIG. 3B are identified by the reference numerals 42, 43, 45 and 47.

Figure 1:
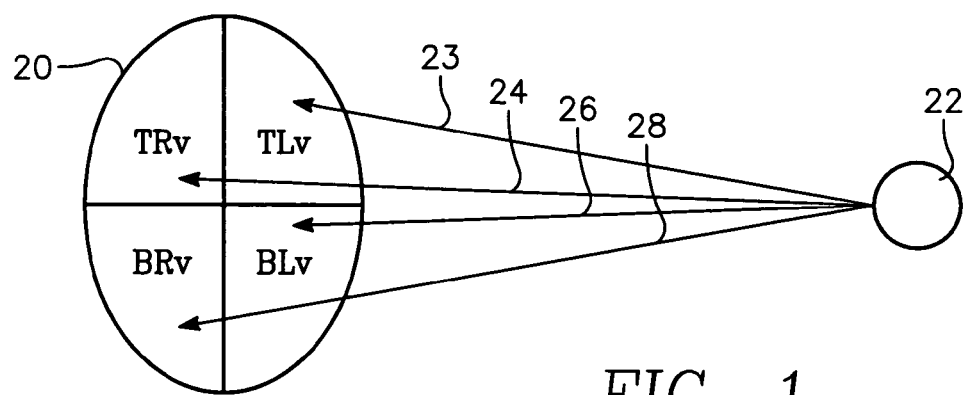
FIG. 1 illustrates an example of a single (RF) radio frequency reflector looking into a monopulse antenna.
Figure 5A:
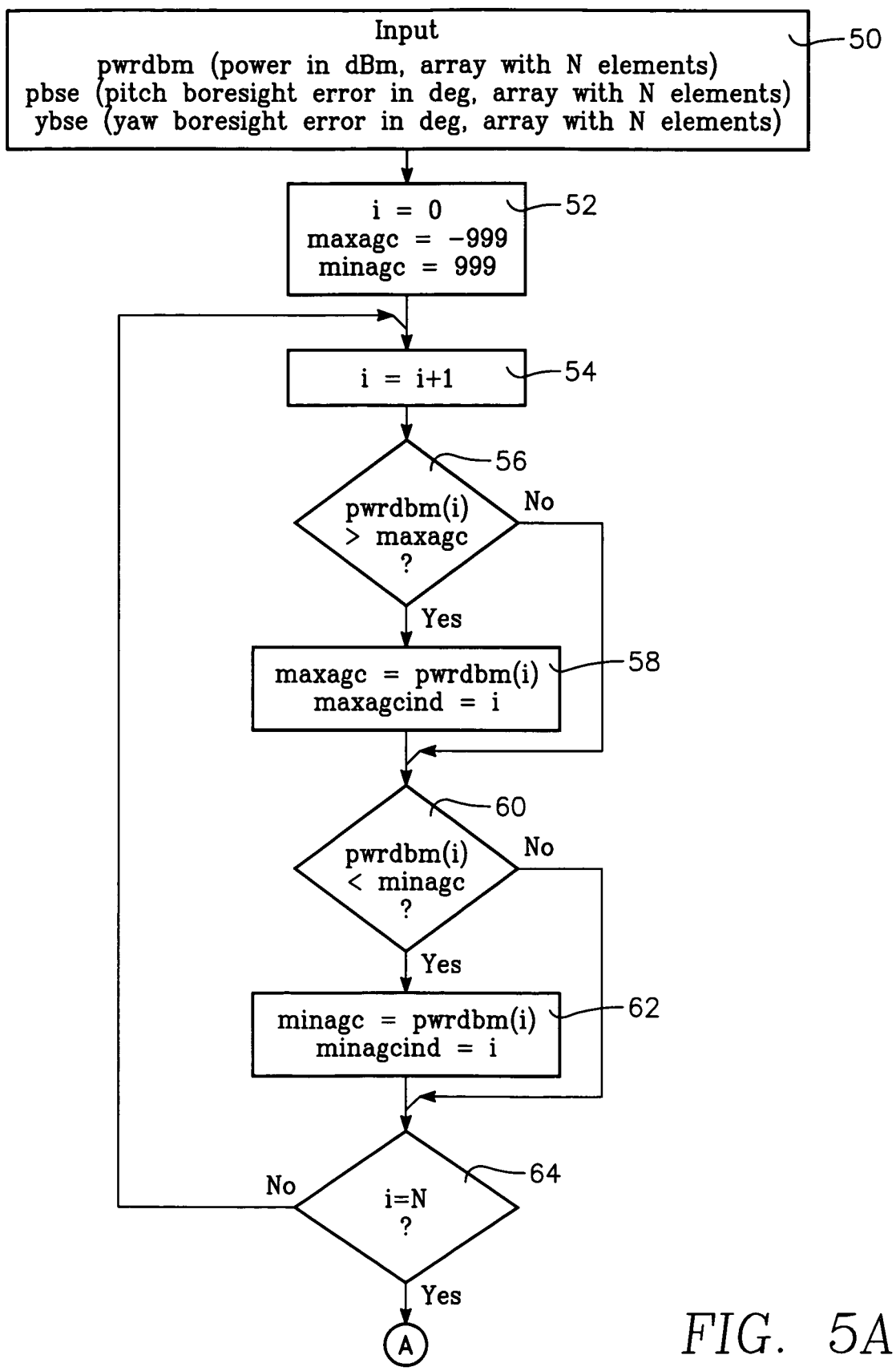
FIGS. 5A-5F illustrate a flow chart for a computer software program which uses the method of the present invention to calculate two signals' angles from a monopulse antenna composite signal.

Referring to FIG. 5A, the inputs which are set forth in program step 50 are power in dBm, pitch bore sight error in degrees and yaw boresight error in degrees. The sample set array has N elements. A certain number of samples of bore sight error information are provided by the antenna 20 (FIG. 1) in the form of a pitch channel signal which is an analog signal having a mean and a variance and a yaw channel signal. The antenna generates the pitch and yaw channel signals by adding the four antenna quadrants in the manner illustrated by FIG. 1.

Referring to FIG. 5A, the program first sets forth the required number of samples of bore sight error information (program step 50 and 52), increments the sample by one (program step 54) and loops through program steps 56, 58, 60 and 62 until the required number of samples are obtained (program step 64). The required number of samples are obtained simultaneously from the pitch and yaw boresight error channels and the power return from the dominant target. The user selects the required number of samples of bore sight error information and power data to allow for a highly accurate statistical mean and variance.

Figure 5B:
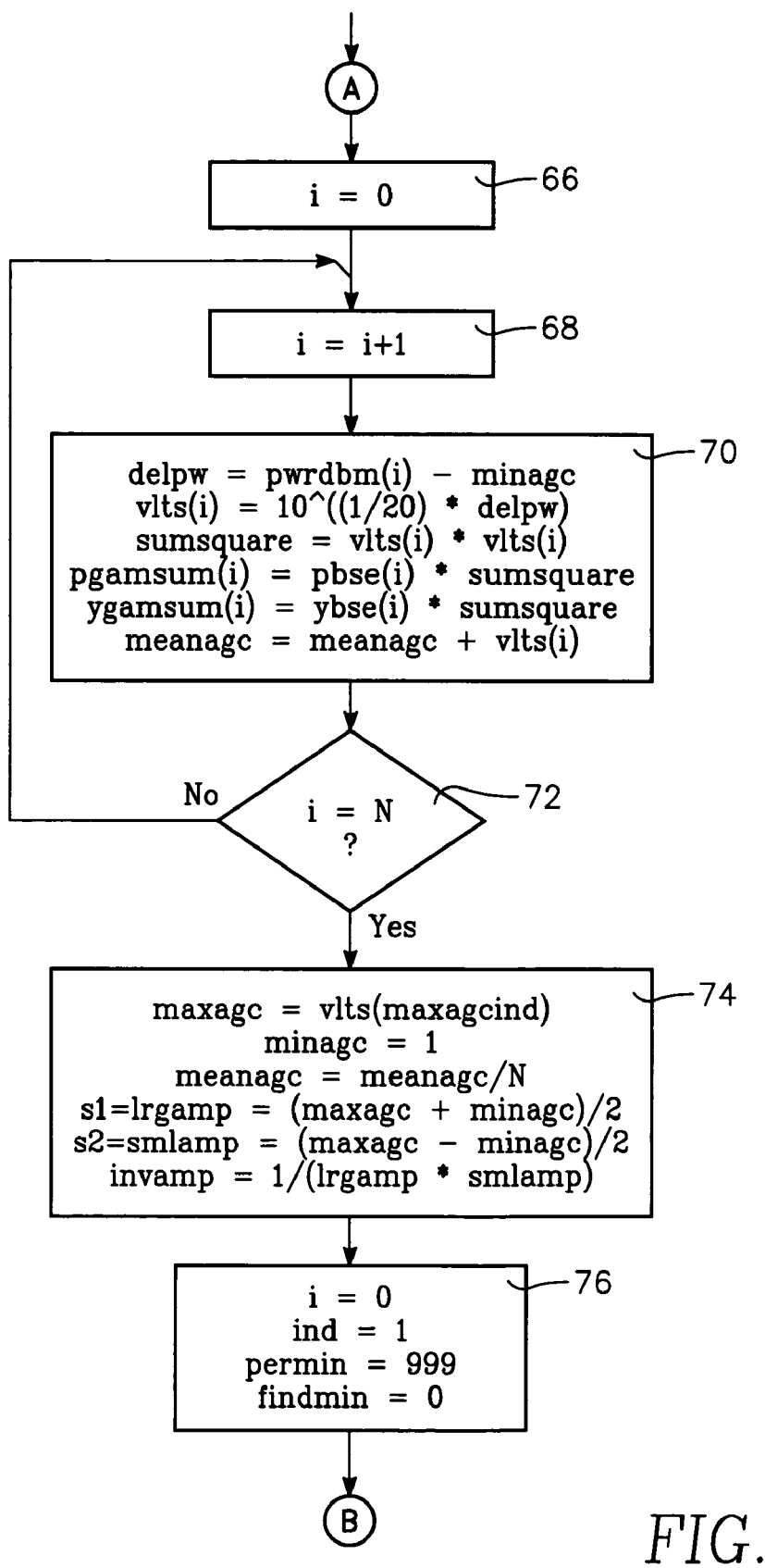

Referring to FIG. 5B, the program loops across the number of samples obtained to find a beat pattern (illustrated by FIG. 2A) for the two target RF signals which are competing with each other. The beat pattern (FIG. 2A) for the two target RF signals yields coherent interference and coherent addition. The program then finds every minimum or null 38 in the beat pattern caused by destructive interference, tags each minimum 38 in the sample, and looks at the data between every consecutive set of minimums 38 in the sample.

The program averages the boresight error in both the pitch and yaw channels over the sample period shown in FIG. 2A. This averaging technique yields the dominant target's boresight error.

When there are N minimums or nulls 38 in the sample, the program develops a mean for the N averages 30, 32, 34 and 36 of the sample period of FIG. 2A and a variance for the N averages 30, 32, 34 and 36 of the sample period of FIG. 2A. The variance is used to feed Kalman filter variances from the N samples.

To determine the second/secondary target's angle, the program first multiplies the bore sight error signal (pitch and yaw) by the linearized AGC power signal to obtain a function, which is linear. The DC term of the function is filtered out by subtracting the mean for the N samples. The amplitude of the AC term is then obtained by taking the RMS (root mean square) value across the N samples. The amplitude of the AC term divided by the amplitude for signals S1 and S2 minus the dominate targets boresight error yields the secondary targets boresight error.

The program provides both mean and variance information for the dominant target and the secondary target for the sample length illustrated in FIGS. 2A and 2B.

Referring to FIG. 5A, program step 50 defines the inputs pwrdbm (power in dBm, array with N elements), pbse (pitch boresight error in degrees, array of N elements) and ybse (yaw boresight error in degrees, array with N elements). The program first sets forth the required number of samples of bore sight error information (program step 52). Program step 54 increments the count by one over the required number of samples. The program searches through the N samples to find every minimum in the power return and also searches the samples to find the maximum power return for the N samples (program steps 56, 58, 60 and 62). When the required number of samples have been processed (program step 64), the program proceeds through step 66 to steps 68, 70 and 72. During program step 70 the delta power (delpw) is calculated for the N samples.

In program step 74 the program uses delta power to determine S1 and S2 which are the amplitudes lrgamp and smlamp respectively for the two RF signals. When the two signal are added to each other the signals produce the maximum power return lrgamp. When the two signal interfere with each other the signals produce the minimum power return smlamp.

Program step 70 also converts dBm (power level for deplw) to linear volts using the following expression.

$$vlts(i) = 10^{((1/20)*delpw)} \tag{28}$$

Further, during program step 70 linear voltage is squared in accordance with the following expression, $$sumsquare = vlts(i) * vlts(i) \tag{29}$$

which provides for linear power. The linear power is next multiplied by the pitch boresight error (pbse(i)) and the yaw boresight error (ybse(i)) in accordance with the following expressions.

$$pgamsum(i) = pbse(i) * sumsquare \tag{30}$$

$$ygamsum(i) = ybse(i) * sumsquare \tag{31}$$

During program step 70, the mean is also calculated by averaging power across the N samples in accordance with the following expression.

$$meanagc = meanagc + vlts(i) \tag{32}$$

Program step 74 converts the maximum power maxagc to volts obtaining the maximum power value (vlts(maxagcind)) from an index previously created by the program. The minimum power minagc is one since the dBm/power is normalized such that the smallest signal is zero dB. This results in a linear voltage of one, i.e. ten to the zero, which is an exponential function equal to one.

Program step 74 also calculates the meanagc for the N samples. S1 and S2, which are the voltage amplitudes for the two signals, are calculated during program step 74 in accordance with the following expression.

$$s1 = lrgamp = (maxagc + minagc)/2 \tag{33}$$

$$s2 = lrgamp = (maxagc - minagc)/2 \tag{34}$$

A temporary variable invamp is also generated during program step 74 in accordance with the following expression.

$$invamp = 1/(lrgamp * smlamp) \tag{35}$$

Figure 5C:
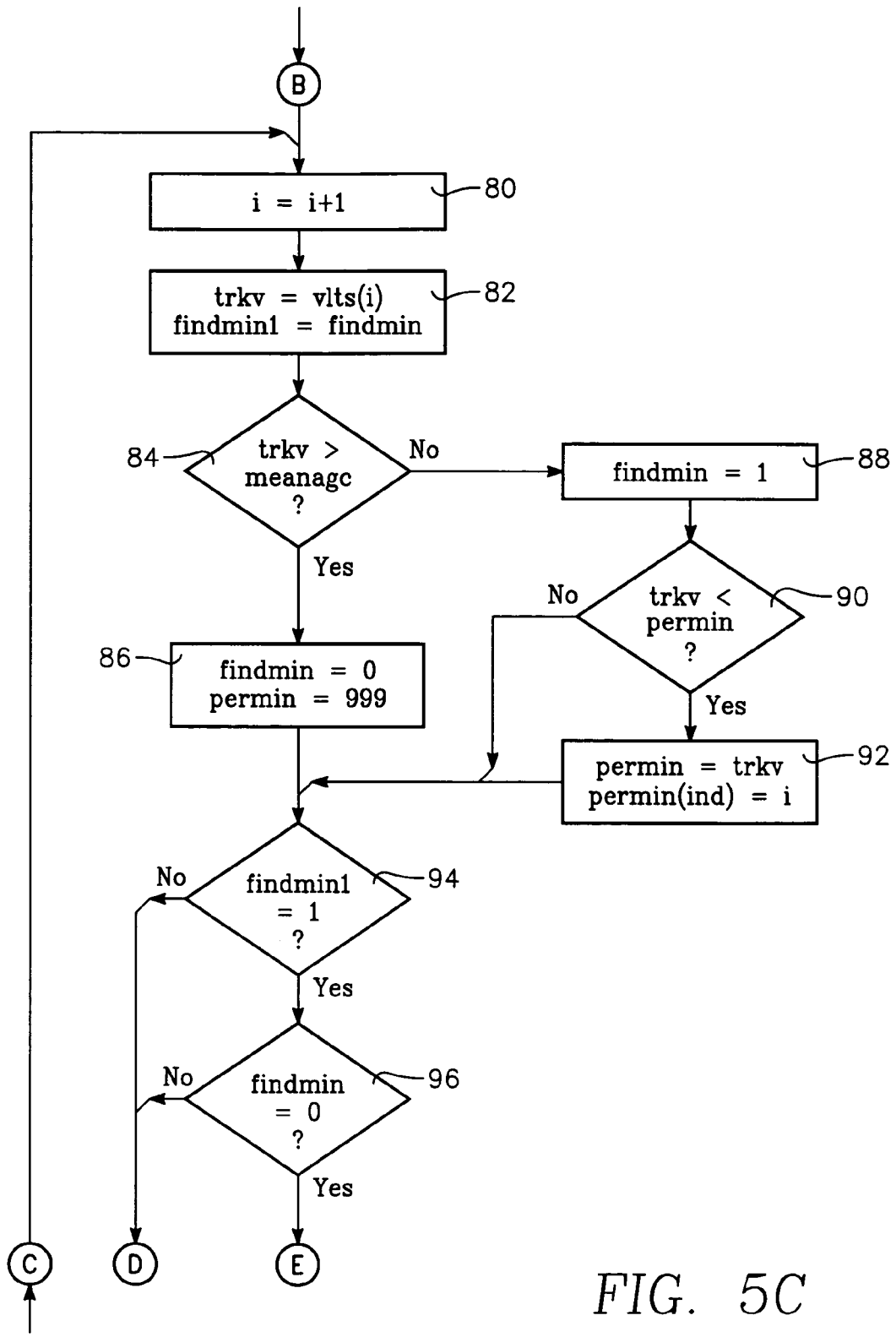
Figure 5D:
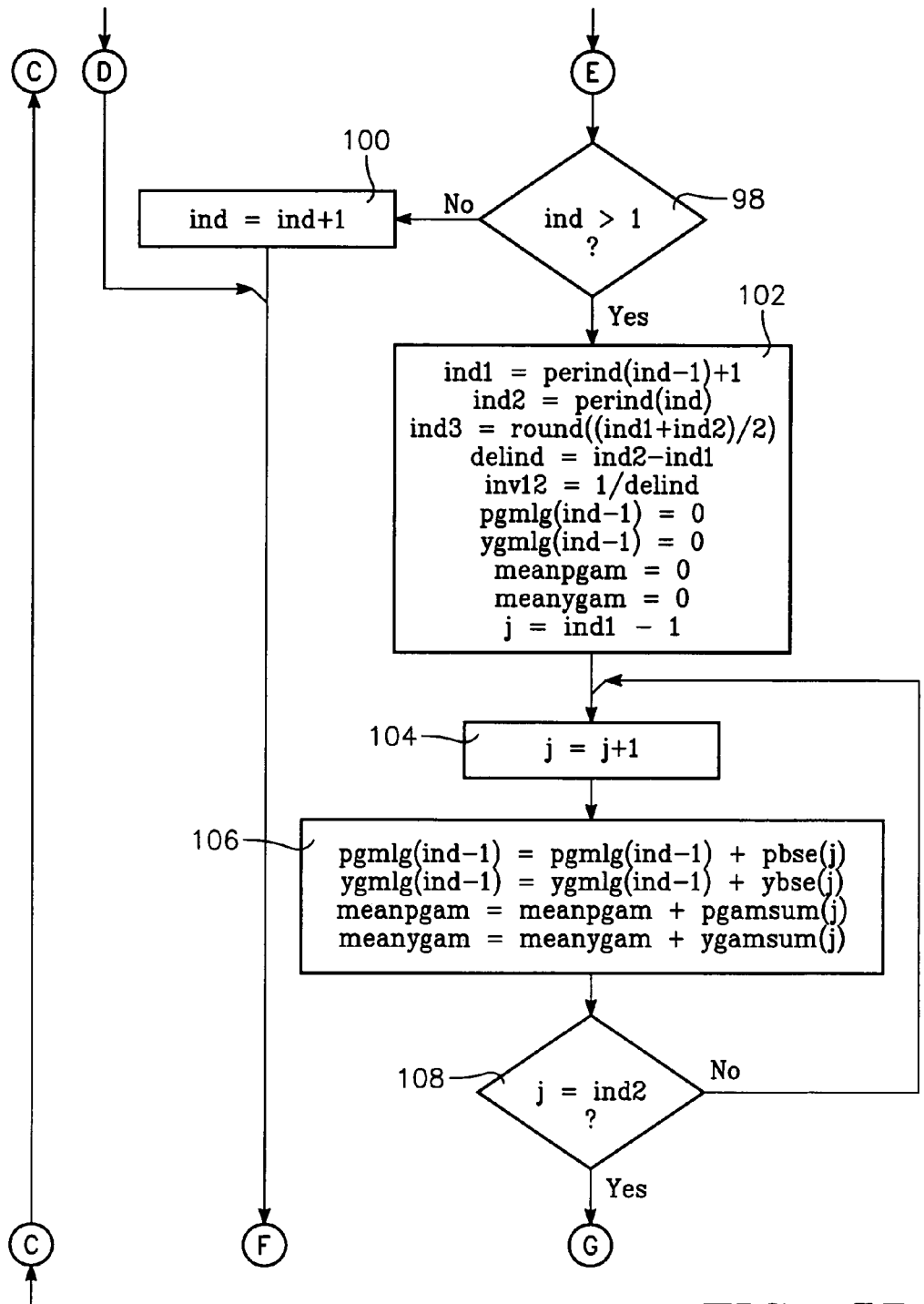

Referring to FIG. 5C, program steps 80, 82, 84, 86, 88, 90, 92, 94 and 96, find nulls in the signal from destructive interferences in the two RF signals reflected from the dominant and secondary targets. A Pointer is reset to allow the program to again cycle through the N samples (program step 76). For each of the N samples the program attempts to find each minimum destructive interference null by comparing a track voltage trkv to the meanagc previously calculated by the program. This attempt by the program to locate each null for the N samples occurs during program steps 80, 82, 84, 86, 88, 90, 92, 94 and 96. Trkv is equal to vlts(i) which was calculated during program step 70.

When trkv is greater than meanagc the program proceeds to reset an internal counter to look for a new null. When the track voltage trkv is less than meanagc, the program recognizes that a minimum signal level or null will occur in a particular region. The program increases its pointer until the last time the track voltage trkv is less than a previously established minimum for a beat period, i.e. the preset minimum permin (established in program step 76) for the beat period. As soon as the track voltage trkv is greater than meanagc for a sample, the last minimum signal level or null is saved by the program.

When the program finds a minimum signal level and is unable to find another minimum signal level in the next search for a minimum signal level, the program is able to verify that the last minimum signal level saved is the smallest value for a null.

Referring to program steps 5D and 5E, program steps 98, 102, 104, 106, 108 and 110 calculate the pitch and yaw angles for the dominant target's angular position using the beat period between two destructive null caused by the two RF signals reflected from the dominant target and the secondary target.

When the program finds a second minimum, which is indicated by ind>1 (program step 98), than the program looks at the data between the previous minimum (ind-1) and the current minimum (ind) as the period to calculate the dominant target's boresight error and the secondary target's boresight error. In program step 102, ind1 is defined as the previous minimum position, i.e. the sample number out of the N samples having the previous minimum. In program step 102, ind2 is defined as the sample location of the present minimum. Program step 102 then finds the center of the beat period ind3 which is midway between the two null positions. The number of samples in the beat period is defined as delind which is equal to ind2−ind1 and the inverse of delind is defined as inv12.

In program step 102, the dominant target's pitch bore sight error is defined as pgmlg and initialized to zero. The dominant target's yaw boresight error ygmlg is also initialized to zero.

To find the AC components of the linear power times bore sight error function, the program needs to determine the mean value of the function (pitch and yaw) and subtract the mean value out which eliminates the DC component. The mean values for pitch and yaw are defined as meanpgam and meanygam which are initialized to zero.

During program steps 104, 106 and 108, the program will loop through a beat period j and looks at the samples within the beat period. To find the mean (pitch) the program first adds pgmlg and the pitch bore sight error for each sample and then adds the samples together. After adding all of the samples for the beat period together, the program divides by the number of samples to determine the mean pgmlg for pitch (program step 110). The number of samples is ind2−ind1. The identical procedure is used to determine the mean ygmlg for yaw.

During program step 110, the program also calculates the power times the bore sight error functions for pitch and yaw by dividing meanpgam and meanygam by the number of samples.

Figure 5E:
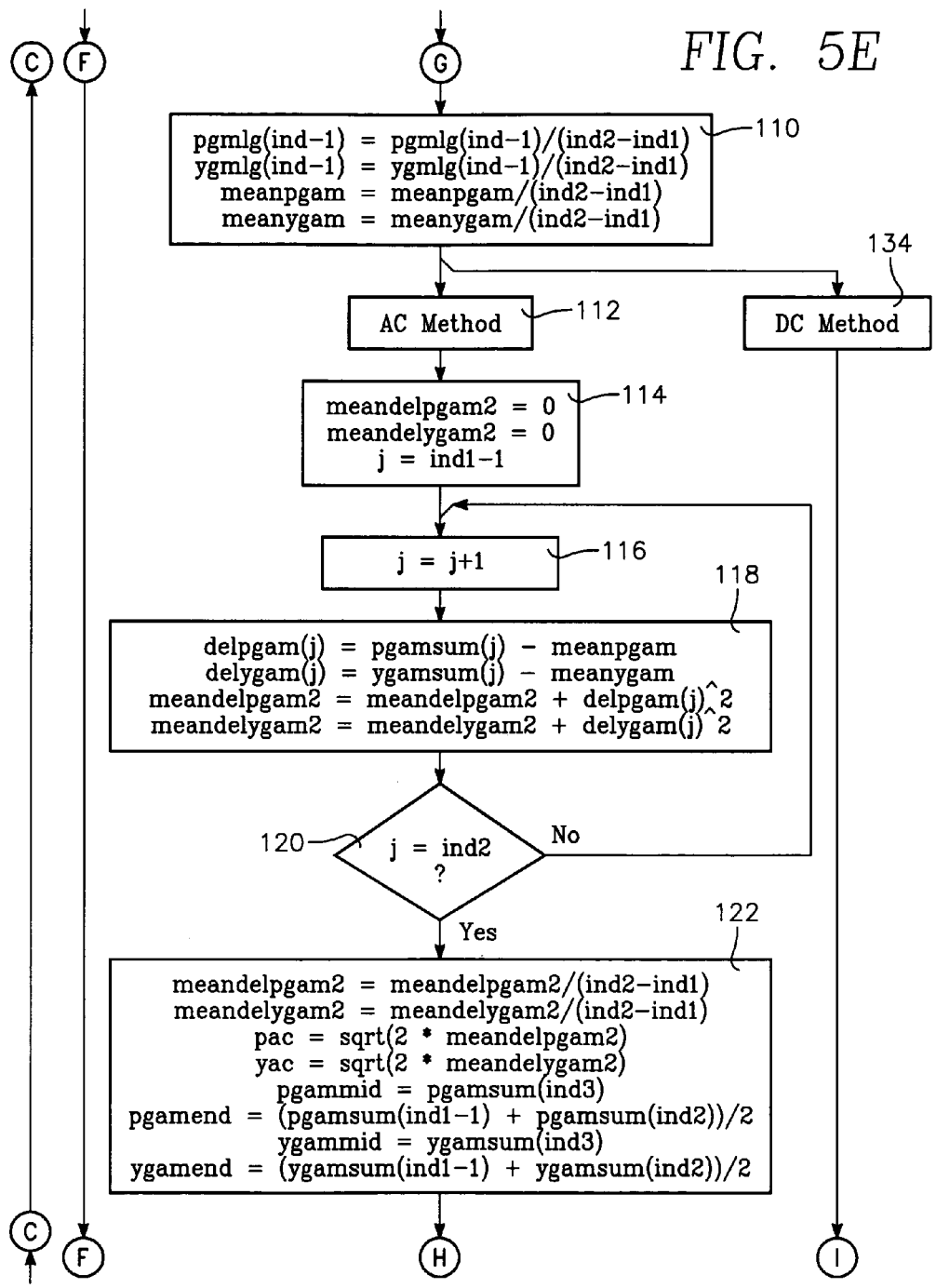
Figure 5F:
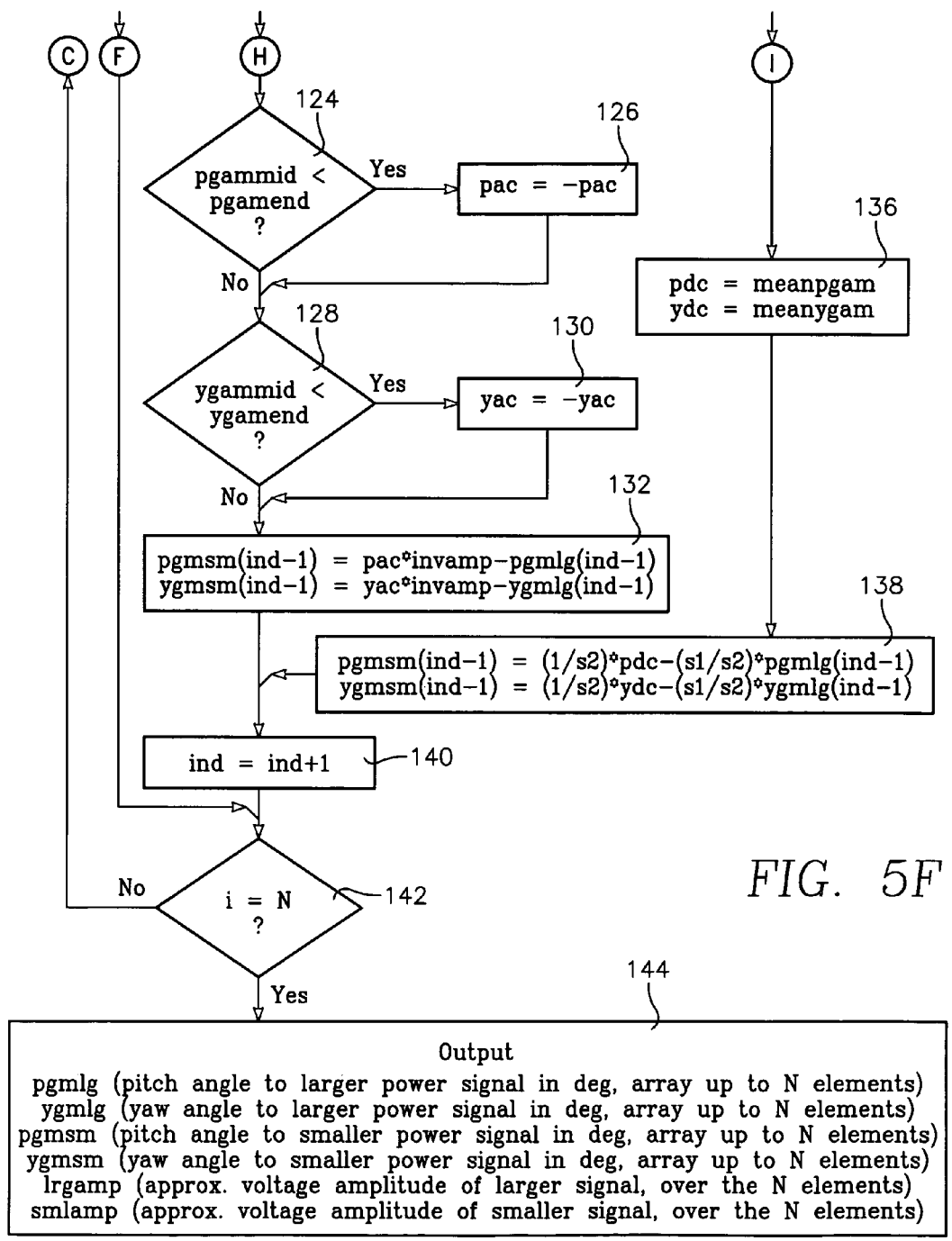

Referring to FIGS. 5E and 5F, the program includes a pair of methods to determine the secondary target's angular position. The AC method and the DC method determine the secondary target's angular position by calculating the pitch and yaw angles of the smaller RF signal (pgmsm and ygmsm) between destructive interference nulls caused by the two RF signals.

The DC method (program steps 134, 136 and 138) utilizes meanpgam and meanygm (from program step 110) to directly calculate the angular position. These values are equal to the DC terms pdc and ydc (program step 136). During program step 138, the secondary target's bore sight error is calculated using the following expression.

$$\text{pgmsm(ind-1)} = (1/s2)*pdc - (s1/s2)*\text{pgmlg(ind-1)} \quad (36)$$

$$\text{ygmsm(ind-1)} = (1/s2)*pdc - (s1/s2)*\text{ygmlg(ind-1)} \quad (37)$$

where pgmsm(ind-1) is the secondary target's pitch bore sight error and ygmsm(ind-1) is the secondary target's yaw bore sight error.

The AC method, which consist of program steps 112, 114, 116, 118, 120, 122, 124, 126, 128, 130, 132, and 140, provides for an enhanced dynamic range and frequency response. The AC method is more effective to calculate angular position whenever there is a large power differential between the two RF signals. Program step 114 sets meandelpgam and meandelygam squared equal to zero. Program step 116 increments j by one.

During program step 118, the AC method takes the linear pitch bore sight error times the power function (pgamsum) and yaw bore sight error times the power function (ygamsum) and subtracts the mean meanpgam from pgamsum and the mean meanygam from ygamsum to determine the AC component of the pitch and yaw power functions delpgam and delygam. The functions delpgam and delygam are then squared and adds the functions together to provide a mean square function for each of the samples in a beat period in accordance with the following expressions.

$$\text{meandelpgam2} = \text{meandelpgam2} + \text{delpgam}(j)^2 \quad (38)$$

$$\text{meandelygam2} = \text{meandelpgam2} + \text{delpgam}(j)^2 \quad (39)$$

During program step 122, the method calculates pac and yac by first dividing meandelpgam2 and meandelpyam2 by ind2-ind1. The method then calculates the square root of the resultant function in accordance with the following expressions $$pac = \text{sqrt}(2*\text{meandelpgam2}) \quad (40)$$

$$yac = \text{sqrt}(2*\text{meandelygam2}) \quad (41)$$

to yield a root mean square estimation of the AC term's amplitude, which is the amplitude of the sine wave representing the secondary target's angular position. PAC is the AC amplitude of the pitch sine wave and YAC is the AC amplitude of the yaw sine wave. Thus, the amplitude of the secondary target's signal in pitch and yaw has been determine allowing for a determination the sine wave's phase.

The phase in pitch is determine by comparing PAC term at the midpoint of a beat period to the PAC terms at the edge of the beat period. Temporary function pgammid is compared with temporary function pgamend in program step 124. When pgammid is less than the pgamend the phase of the sine wave is inverted resulting pac=−pac (program step 126).

The phase in yaw is determine by comparing YAC term at the midpoint of a beat period to the YAC terms at the edge of the beat period. Temporary function ygammid is compared with temporary function ygamend in program step 124. When ygammid is less than the ygamend the phase of the sine wave is inverted resulting yac=−yac (program step 126).

The method having determined PAC and YAC and the dominant target's bore sight error pgmlg and ygmlg, the program can calculate the secondary target's bore sight error pgmsm (pitch) and ygmsm (yaw) for a beat period. During program step 132 calculates in accordance with the following expressions.

$$\text{pgmsm(ind-1)} = pac*\text{invamp} - \text{pgmlg(ind-1)} \quad (42)$$

$$\text{ygmsm(ind-1)} = yac*\text{invamp} - \text{ygmlg(ind-1)} \quad (43)$$

The program analyses the other samples within the period of N samples to find the remaining beat periods and calculate the large signal's bore sight error and the small signal's bore sight error for each of the remaining beat periods within the sample size (program step 142).

Program step 144 provides the outputs which are pgmlg, ygmlg, pgmsm, ygmsm, lrgamp, and smlamp for the primary and secondary targets' angular position. The primary target's position information consist of the pitch angle in degrees, the yaw angle in degrees and amplitude of the primary target's power signal in volts. The secondary target's position information consist of the pitch angle in degrees, the yaw angle in degrees and amplitude of the secondary target's power signal in volts. The position information provided by program step 144 is obtained from an analysis of the N samples over the entire sampling period.

Figure 6:
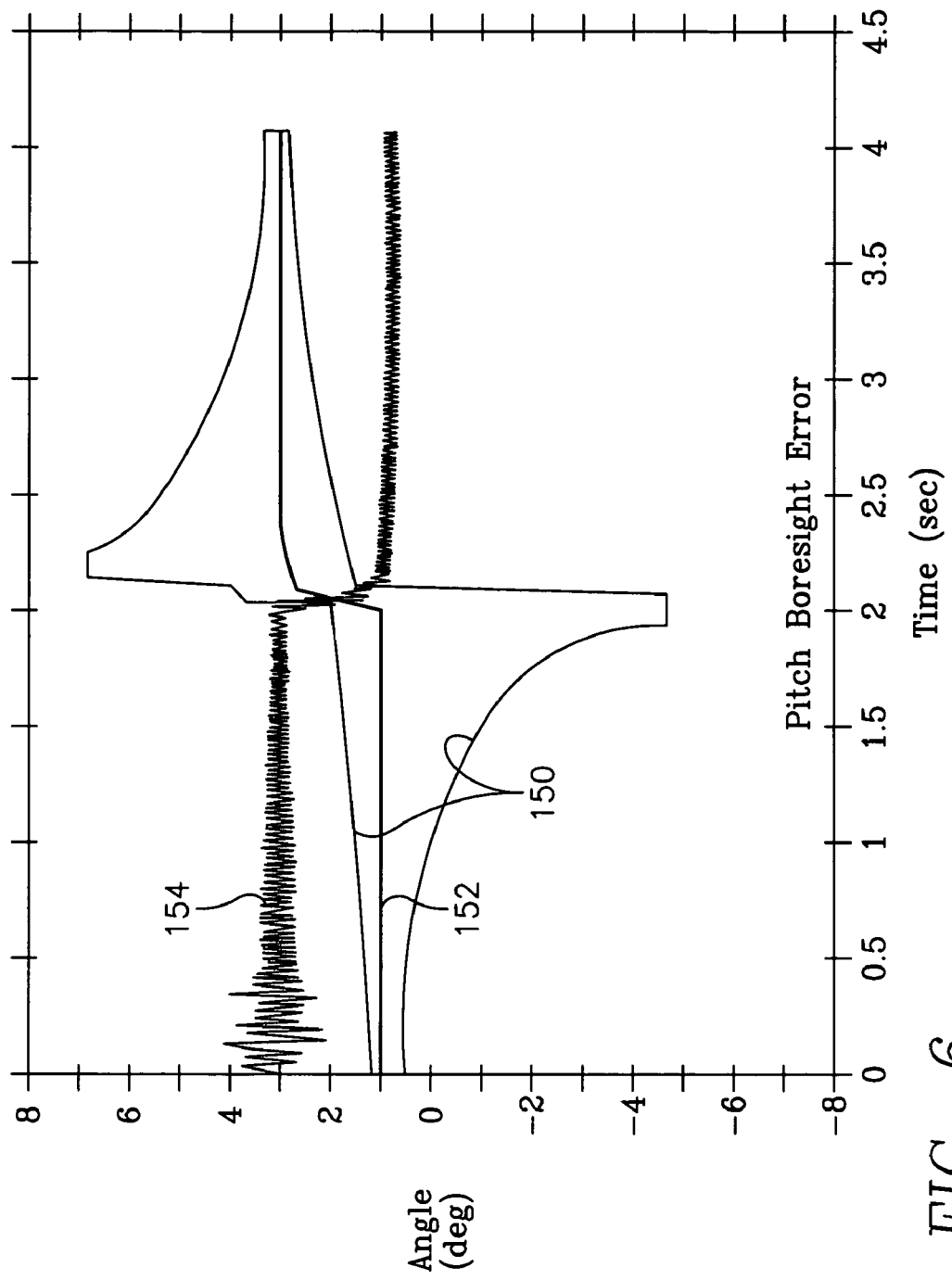
FIG. 6 illustrates Pitch Boresight error as a function of time for a Dominant target and smaller target generated by the method of the present invention.
Figure 7:
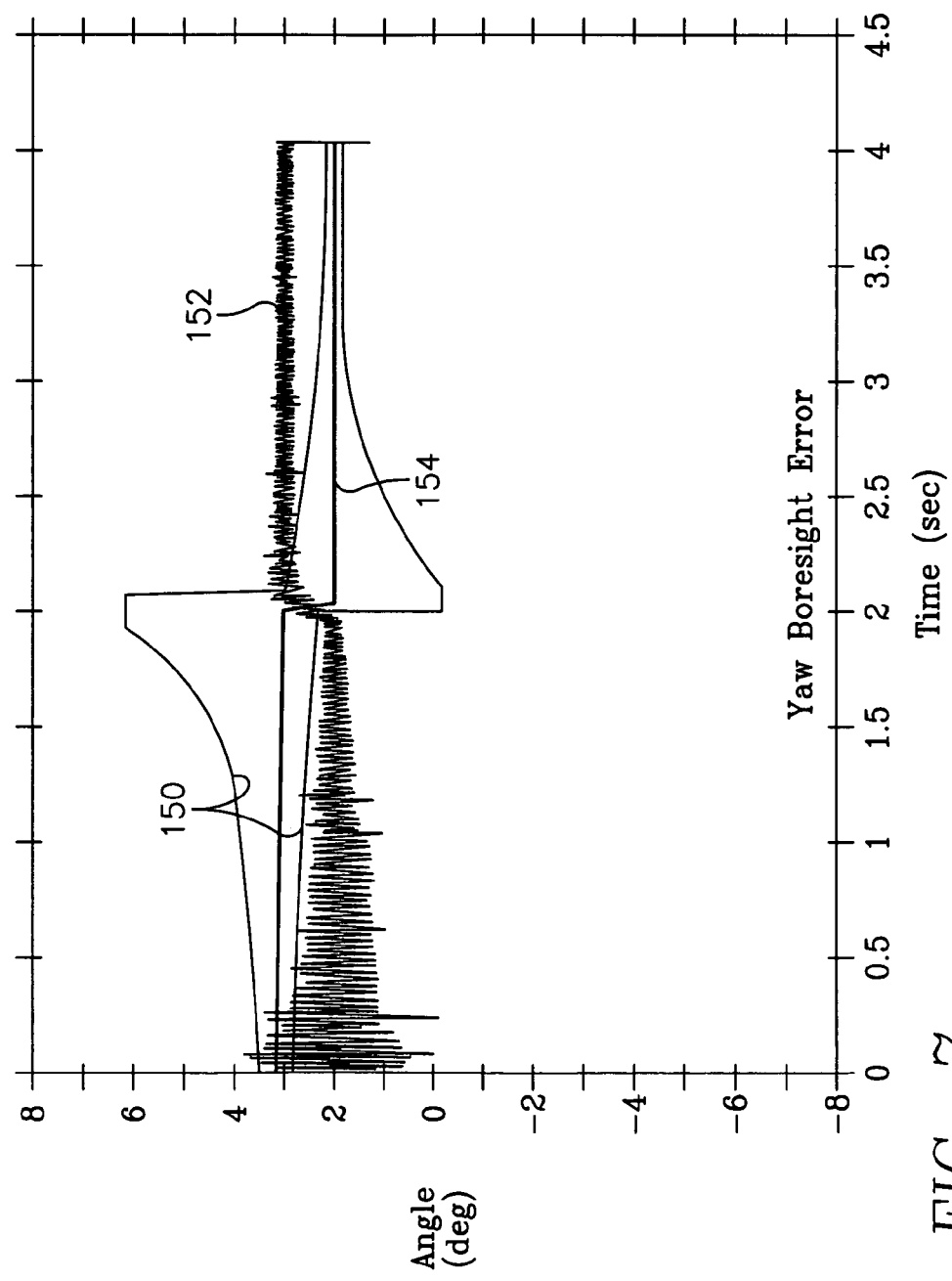
FIG. 7 illustrates Yaw Boresight error as a function of time for a Dominant target and smaller target generated by the method of the present invention.
Figure 8:
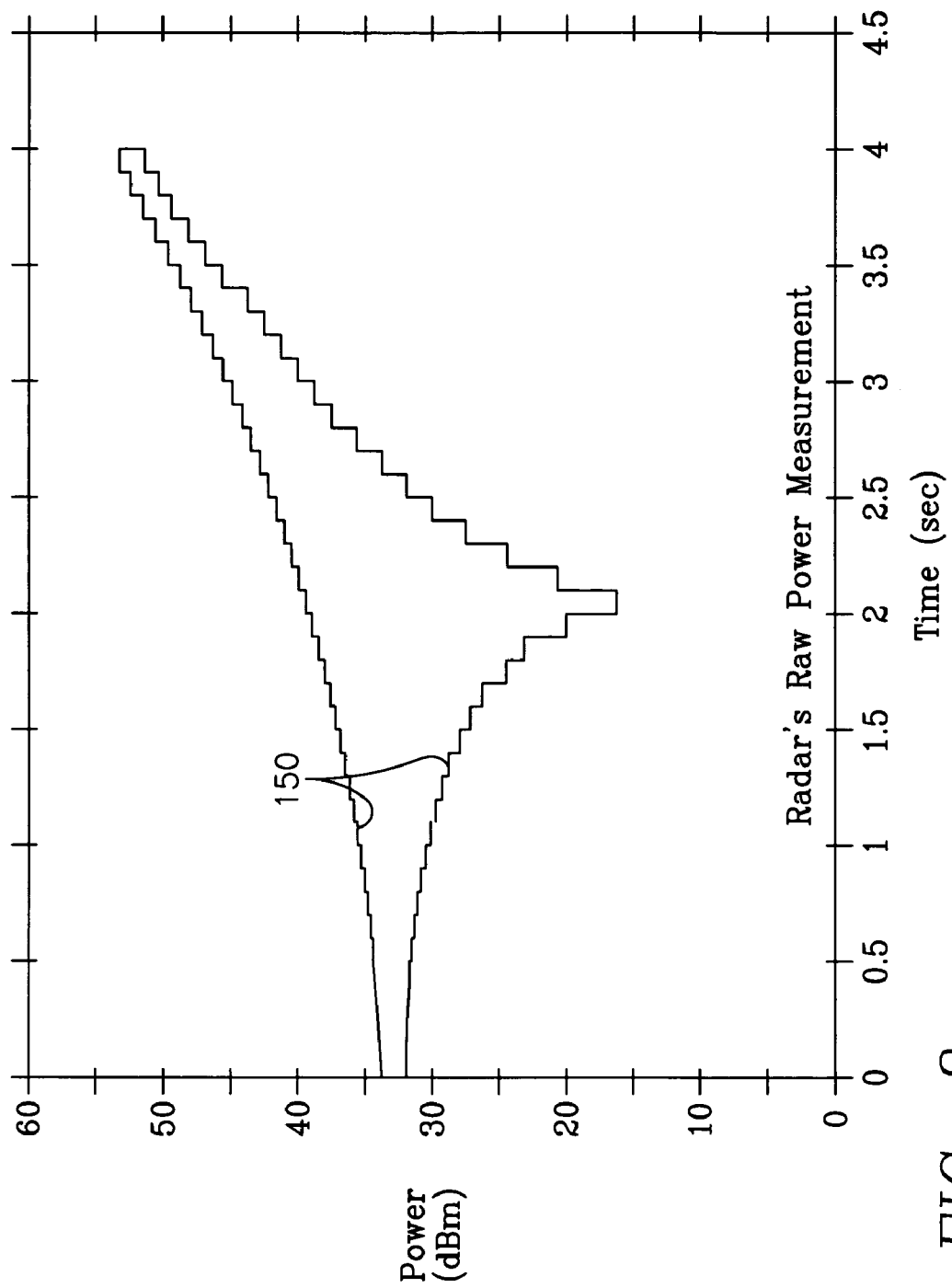
FIG. 8 illustrates a monopulse radar's raw power measurement in dBm as a function of time which is used to determine the angles for the two targets.

Referring to FIGS. 6, 7 and 8, FIG. 6 illustrates the pitch boresight error for two targets in degrees as a function of time measured in seconds. The radar's raw boresight error measurement is identified by the reference numeral 150, the calculated angle to the dominant target is identified by the reference numeral 152 and the calculated angle to the smaller target is identified by the reference numeral 154. FIG. 7 illustrates yaw boresight error for two targets in degrees as a function of time measured in seconds. FIG. 8 illustrates the monopulse radar's raw power measurement.

The target at 3 degrees pitch, 2 degrees yaw (represented by plot 154) starts out 20 dB lower in power than the target at 1 degree pitch and 3 degrees yaw (represented by plot 152), crossing over in the middle at 2 seconds until the target (represented by plot 154) is the higher power. This target's power keeps increasing until it is 20 dB higher in power.

From the foregoing, it may readily be seen that the present invention comprises a new, unique and exceedingly useful and effective method for locating multiple angle sources using a monopulse radar which constitutes a considerable improvement over the known prior art. Many modifications and variations of the present inventions are possible in light of the above teachings. It is therefore to be understood that within the scope of the amended the invention may be practiced otherwise than as specifically described.

What is claimed is:

1. A method for locating multiple angle sources using a monopulse radar comprising the steps of:
   (a) receiving a composite radio frequency (RF) signal which includes a first RF signal reflected from a dominant target and a second RF signal from a secondary target, wherein said monopulse radar receives said composite RF signal;
   (b) calculating a voltage amplitude S1 for said first RF signal across a sample size wherein said voltage amplitude S1 for said first RF signal is calculated by finding a maximum automatic gain control (AGC) power level across said sample size and a minimum AGC power level across said sample size, and then adding said maximum AGC power level to said minimum AGC power level to determine said voltage amplitude S1;
   (c) calculating a voltage amplitude S2 for said second RF signal across said sample size wherein said voltage amplitude S2 is calculated by subtracting said minimum AGC power level from said maximum AGC power level;
   (d) looping across a preset number of samples obtained from said sample size to find a beat pattern for said first and second RF signals which are competing with each other;
   (e) locating nulls in said beat pattern caused by a destructive interference between said first RF signal and said second RF signal;
   (f) calculating a pitch angle and a yaw angle for said first RF signal wherein said pitch angle and said yaw angle for said first RF signal are calculated within a beat period between adjacent nulls in said beat pattern; and
   (g) calculating a pitch angle and a yaw angle for said second RF signal wherein said pitch angle and said yaw angle for said second RF signal are calculated within the beat period between said adjacent nulls in said beat pattern.

2. The method of claim 1 wherein the voltage amplitude S1 for said first RF signal is calculated according to the following expression:

$$S1 = \tfrac{1}{2} * \text{sqrt}(\text{Max AGC Pwr}) + \tfrac{1}{2} * \text{sqrt}(\text{Min AGC Pwr})$$

where: Max AGC Pwr is the maximum AGC power level across said sample size; and Min AGC Pwr is the minimum AGC power level across said sample size.

3. The method of claim 1 wherein the voltage amplitude S2 for said second RF signal is calculated according to the following expression:

$$S2 = \tfrac{1}{2} * \text{sqrt}(\text{Max AGC Pwr}) - \tfrac{1}{2} * \text{sqrt}(\text{Min AGC Pwr})$$

where: Max AGC Pwr is the maximum AGC power level across said sample size; and Min AGC Pwr the minimum AGC power level across said sample size.

4. The method of claim 1 wherein said pitch angle and said yaw angle for said dominant target are calculated using averaged boresight error information which indicates an angle of arrival for said dominate target.

5. The method of claim 4 wherein said averaged boresight information is determined in accordance with the following expressions:

$$pbselrg = \text{mean}(pbse)$$

$$ybselrg = \text{mean}(ybse)$$

where: pbselrg is pitch bore sight error for said first RF signal, and ybselrg is yaw bore sight error for said second RF signal; and $$pbselrgmean = \text{average}(pbselrg(1), pbselrg(2) \ldots pbselrg(n))$$

$$Pbselrgvar = \text{variance}(pbselrg(1), pbselrg(2) \ldots pbselrg(n))$$

where: pbselrgmean is an average of the pitch bore sight error for the beat periods with said sample size; and Pbselrgvar is a variance for the beat periods with said sample size.

6. The method of claim 5 wherein said averaged boresight error information includes the following expressions:

$$ybselrgmean = \text{average}(ybselrg(1), ybselrg(2) \ldots ybselrg(n))$$

$$Ybselrgvar = \text{variance}(ybselrg(1), ybselrg(2) \ldots ybselrg(n))$$

where: ybselrgmean is an average of the yaw bore sight error for the beat periods with said sample size; and Ybselrgvar is a variance of the yaw bore sight error for the beat periods within said sample size.

7. The method of claim 5 wherein said pitch angle and said yaw angle for said second RF signal are calculated in accordance with the following expressions:

$$pbsemldc = (1/S2)^2 * PDC - (S1/S2)^2 * pbselrg$$

$$ybsemldc = (1/S2)^2 * YDC - (S1/S2)^2 * ybselrg$$

where pbsemldc is the pitch angle for said second RF signal; ybsemldc is the yaw angle for said second RF signal; and PDC and YDC are defined by the following expressions:

$$PDC = \text{mean}(pbsesum2)$$

$$YDC = \text{mean}(ybsesum2)$$

where pbsesum2 is linearized AGC power multiplied by the pitch bore sight error for said first RF signal and ybsesum2 is the linearized AGC power multiplied by the yaw bore sight error for said first RF signal.

8. A method for locating multiple angle sources using a monopulse radar comprising the steps of:
   (a) receiving a composite radio frequency (RF) signal which includes a first RF signal reflected from a dominant target and a second RF signal from a secondary target, wherein said monopulse radar receives said composite signal;
   (b) calculating a voltage amplitude S1 for said first RF signal across a sample size wherein the voltage amplitude S1 for said first RF signal is calculated by finding a maximum automatic gain control (AGC) power level across said sample size and a minimum AGC power level across said sample size, the voltage amplitude S1 for said first RF signal being calculated according to the following expression:

$$S1 = \tfrac{1}{2} * \text{sqrt}(\text{Max AGC Pwr}) + \tfrac{1}{2} * \text{sqrt}(\text{Min AGC Pwr})$$

where: Max AGC Pwr is the maximum AGC power level across said sample size; and Min AGC Pwr is the minimum AGC power level across said sample size;

(c) calculating a voltage amplitude S2 for said second RF signal across said sample size, wherein the voltage amplitude S2 for said second RF signal is calculated according to the following expression:

$$S2 = \tfrac{1}{2} * \text{sqrt}(\text{Max AGC Pwr}) - \tfrac{1}{2} * \text{sqrt}(\text{Min AGC Pwr})$$

where: Max AGC Pwr is the maximum AGC power level across said sample size; and Min AGC Pwr the minimum AGC power level across said sample size;

(d) looping across a preset number of samples obtained from said sample size to find a beat pattern for said first and second RF signals which are competing with each other;

(e) locating nulls in said beat pattern caused by a destructive interference between said first RF signal and said second RF signal;

(f) calculating a pitch angle and a yaw angle for said first RF signal wherein said pitch angle and said yaw angle for said first RF signal are calculated within a beat period between adjacent nulls in said beat pattern; and (g) calculating a pitch angle and a yaw angle for said second RF signal wherein said pitch angle and said yaw angle for said second RF signal are calculated within the beat period between said adjacent nulls in said beat pattern, said pitch angle and said yaw angle for said second RF signal being calculated in accordance with the following expressions:

$$pbsemldc=(1/S2)^2*PDC-(S1/S2)^2*pbselrg$$

$$ybsemldc=(1/S2)^2*YDC-(S1/S2)^2*ybselrg$$

where pbsemldc is the pitch angle for said second RF signal; ybsemldc is the yaw angle for said second RF signal; pbselrg is pitch bore sight error for said first RF signal; ybselrg is yaw bore sight error for said first RF signal; and PDC and YDC are defined by the following expressions:

$$PDC=\text{mean}(pbsesum2)$$

$$YDC=\text{mean}(ybsesum2)$$

where pbsesum2 is linearized AGC power multiplied by the pitch bore sight error for said first RF signal and ybsesum2 is the linearized AGC power multiplied by the yaw bore sight error for said first RF signal.

9. The method of claim 8 wherein said pitch angle and said yaw angle for said dominant target are calculated using averaged boresight error information which indicates an angle of arrival for said dominate target.

10. The method of claim 9 wherein said averaged boresight information is determined in accordance with the following expressions:

$$pbselrg=\text{mean}(pbse)$$

$$ybselrg=\text{mean}(ybse)$$

where: pbselrg is pitch bore sight error for said first RF signal, and ybselrg is yaw bore sight error for said second RF signal; and $$pbselrgmean=\text{average}(pbselrg(1),pbselrg(2)\ldots pbselrg(n))$$

$$Pbselrgvar=\text{variance}(pbselrg(1),pbselrg(2)\ldots pbselrg(n))$$

where: pbselrgmean is an average of the pitch bore sight error for the beat periods with said sample size; and Pbselrgvar is a variance of the pitch bore sight error for the beat periods within said sample size.

11. The method of claim 10 wherein said averaged boresight error information includes the following expressions:

$$ybselrgmean=\text{average}(ybselrg(1),ybselrg(2)\ldots ybselrg(n))$$

$$Ybselrgvar=\text{variance}(ybselrg(1),ybselrg(2)\ldots ybselrg(n))$$

where: ybselrgmean is an average of the yaw bore sight error for the beat periods with said sample size; and Ybselrgvar is a variance of the yaw bore sight error for the beat periods within said sample size.

12. The method of claim 8 wherein a user of said method selects said preset number of samples obtained from said sample size to find said beat pattern.

13. A method for locating multiple angle sources using a monopulse radar comprising the steps of:

(a) receiving a composite radio frequency (RF) signal which includes a first RF signal reflected from a dominant target and a second RF signal from a secondary target, wherein said monopulse radar receives said composite signal;

(b) calculating a voltage amplitude S1 for said first RF signal across a sample size wherein the voltage amplitude S1 for said first RF signal is calculated by finding a maximum automatic gain control (AGC) power level across said sample size and a minimum AGC power level across said sample size, the voltage amplitude S1 for said first RF signal being calculated according to the following expression;

$$S1=\tfrac{1}{2}*\text{sqrt}(\text{Max AGC Pwr})+\tfrac{1}{2}*\text{sqrt}(\text{Min AGC Pwr})$$

where: Max AGC Pwr is the maximum AGC power level across said sample size; and Min AGC Pwr is the minimum AGC power level across said sample size;

(c) calculating a voltage amplitude S2 for said second RF signal across said sample size, wherein the voltage amplitude S2 for said second RF signal is calculated according to the following expression;

$$S2=\tfrac{1}{2}*\text{sqrt}(\text{Max AGC Pwr})-\tfrac{1}{2}*\text{sqrt}(\text{Min AGC Pwr})$$

where: Max AGC Pwr is the maximum AGC power level across said sample size; and Min AGC Pwr the minimum AGC power level across said sample size;

(d) looping across a preset number of samples obtained from said sample size to find a beat pattern for said first and second RF signals which are competing with each other;

(e) locating nulls in said beat pattern caused by a destructive interference between said first RF signal and said second RF signal;

(f) calculating a pitch angle and a yaw angle for said first RF signal wherein said pitch angle and said yaw angle for said first RF signal are calculated within a beat period between adjacent nulls in said beat pattern; and (g) calculating a pitch angle and a yaw angle for said second RF signal, wherein said pitch angle and said yaw angle for said second RF signal are calculated within the beat period between said adjacent nulls in said beat pattern, said pitch angle and said yaw angle being calculated in accordance with the $$pbsemlac=(1/S1*S2))*PAC-pbselrg$$

$$ybsemlac=(1/S1*S2))*YAC-ybselrg$$

where pbsemlac is the pitch angle for said second RF signal; ybsemlac is the yaw angle for said second RF signal; pbselrg is pitch bore sight error for said first RF signal; ybselrg is yaw bore sight error for said first RF signal, PAC is an AC amplitude for a pitch sine wave and YAC is an AC amplitude for a yaw sine wave, wherein said pitch sine wave is represented by the following expression:

$$pbsesum2=pbse*\text{Linear Power}$$

and said yaw sine wave is represented by the following expression:

$$ybsesum2 = ybse * \text{Linear Power}$$

and each of said pitch and yaw sine waves having a DC offset.

14. The method of claim 13 wherein the AC amplitude PAC for said pitch sine wave is determined by finding peak to peak values for said pitch sine wave and dividing by two and the AC amplitude YAC for said yaw sine wave is determined by finding peak to peak values for said yaw sine wave and dividing by two.

15. The method of claim 14 wherein the AC amplitude PAC for said pitch sine wave and the AC amplitude YAC for said yaw sine wave are represented by the following expressions:

$$PAC = (\max(pbsesum2) - \min(pbsesum2))/2$$

$$YAC = (\max(ybsesum2) - \min(ybsesum2))/2$$

where max(pbsesum2)−min(pbsesum2, and max(ybsesum2)−min(ybsesum2) are the peak to peak values for said pitch sine wave and said yaw sine wave, respectively.

16. The method of claim 13 wherein the AC amplitude PAC for said pitch sine wave and the AC amplitude YAC for said yaw sine wave are represented by the following expressions:

$$PAC = \text{sqrt}[2 * \text{mean}(PACtmp * PACtmp)]$$

$$YAC = \text{sqrt}[2 * \text{mean}(YACtmp * YACtmp)]$$

where $$PACtmp = pbsesum2 - PDC$$

$$YACtmp = pbsesum2 - YDC$$

and PDC and YDC are DC components of said pitch sine wave and said yaw sine wave, respectively.

17. The method of claim 13 wherein said pitch angle and said yaw angle for said dominant target are calculated using averaged boresight error information which indicates an angle of arrival for said dominate target.

18. The method of claim 17 wherein said averaged boresight information is determined in accordance with the following expressions:

$$pbselrg = \text{mean}(pbse)$$

$$ybselrg = \text{mean}(ybse)$$

where: pbselrg is pitch bore sight error for said first RF signal, and ybselrg is yaw bore sight error for said second RF signal; and $$pbselrgmean = \text{average}(pbselrg(1), pbselrg(2) \ldots pbselrg(n))$$

$$Pbselrgvar = \text{variance}(pbselrg(1), pbselrg(2) \ldots pbselrg(n))$$

where: pbselrgmean is an average of the pitch bore sight error for the beat periods with said sample size; and Pbselrgvar is a variance of the pitch bore sight error for the beat periods within said sample size.

19. The method of claim 18 wherein said averaged boresight error information includes the following expressions:

$$ybselrgmean = \text{average}(ybselrg(1), ybselrg(2) \ldots ybselrg(n))$$

$$Ybselrgvar = \text{variance}(ybselrg(1), ybselrg(2) \ldots ybselrg(n))$$

where: ybselrgmean is an average of the yaw bore sight error for the beat periods with said sample size; and Ybselrgvar is a variance of the yaw bore sight error for the beat periods within said sample size.

20. The method of claim 13 wherein a user of said method selects said preset number of samples obtained from said sample size to find said beat pattern.

* * * * *